June 18, 1946.　　　　E. H. LAND　　　2,402,166
PLASTIC SHEET AND METHOD OF MANUFACTURE
Filed May 22, 1942

Edwin H. Land
INVENTOR.
BY Donald L. Brown
Attorney

Patented June 18, 1946

2,402,166

UNITED STATES PATENT OFFICE 2,402,166

PLASTIC SHEET AND METHOD OF MANUFACTURE

Edwin H. Land, Cambridge, Mass., assignor to Polaroid Corporation, Cambridge, Mass., a corporation of Delaware Application May 22, 1942, Serial No. 444,143

15 Claims. (Cl. 88—65)

This invention relates to a composite plastic sheet or film particularly adapted for use in the production of light-polarizing material and stereoscopic images embodying light-polarizing material, and methods of making said sheet or film.

An object of the present invention is to provide a sheet or film of transparent plastic material whose surfaces comprise molecularly oriented polyvinyl alcohol, the inner portion of which comprises material substantially less hydrophilic than polyvinyl alcohol, and particularly such a sheet having the direction of molecular orientation of one surface substantially at right angles to the direction of molecular orientation of its other surface.

Another object is to provide a transparent sheet or film comprising predominantly a derivative of polyvinyl alcohol, having a layer on one surface thereof at least partially converted by regeneration to polyvinyl alcohol, and particularly such a sheet which has been treated to orient the molecules in said polyvinyl alcohol surface layer.

A further object is to provide a composite sheet or film comprising a pair of sheets of a transparent polyvinyl alcohol derivative, each of which has an integrally formed surface layer comprising polyvinyl alcohol and which are bonded together back to back with said polyvinyl alcohol layers outermost and the directions of molecular orientation therein substantially at right angles to each other.

Further objects are to provide sheets of the above type which have been stained with a dichroic dye or stain and thereby rendered light-polarizing, and particularly sheets of the above type which have right and left eye stereoscopic images reproduced on the opposite surfaces thereof by means of dichroic dyes or stains.

A still further object is to provide methods for making sheets of the above type.

Other objects and advantages will in part appear and in part be pointed out in the course of the following detailed description of one of more embodiments of the invention, which are given as non-limiting examples, in connection with the accompanying drawing, in which.

Figure 1:
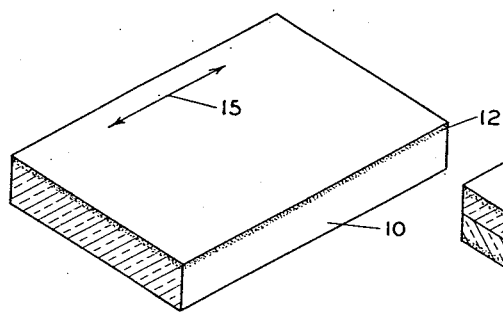
Figure 1 is a diagrammatic view in perspective showing a sheet constituting an embodiment of the invention.

It has recently been discovered that dichroic light polarizers and dichroic images may be formed by applying a dichroic dye or stain to the surface of a sheet of suitably molecularly oriented transparent plastic material, such particularly as polyvinyl alcohol. Preferably, in the formation of dichroic stereoscopic images, there may first be provided a sheet of plastic material whose outer surfaces comprise polyvinyl alcohol molecularly oriented in directions at right angles to each other, and the images may then be superimposed by printing one on one surface of the sheet and the other on the other surface with a suitable dichroic dye or stain. The present invention is concerned particularly with the provision of sheets or films of this type.

In accordance with the present invention, it has been discovered that improved sheets of the desired properties may be prepared from derivatives of polyvinyl alcohol by regenerating or converting a layer on a surface thereof to polyvinyl alcohol, and by suitably stretching or otherwise treating said sheet in appropriate stages of the process to orient the molecules of said layer. Single sheets of this type may be used advantageously in the production of dichroic light polarizers, and two sheets of this type may be bonded together back to back, with the directions of molecular orientation in their respective layers at right angles to each other for use in the production of dichroic stereoscopic images.

The process of the present invention is applicable to substantially all transparent organic plastics which may be made from polyvinyl alcohol, and hence which may be converted or regenerated to polyvinyl alcohol while in sheet form. For the purposes of this description and the claims herein, the materials falling within this class will be termed "derivatives of polyvinyl alcohol." Preferred materials for the purpose of the invention are from the class consisting of the organic acid esters of polyvinyl alcohol, such for example as polyvinyl acetate and polyvinyl formate or the copolymer of polyvinyl acetate and polyvinyl chloride, and the cyclic ethers of polyvinyl alcohol, such particularly as the acetals and ketals of polyvinyl alcohol. The term "acetals and ketals of polyvinyl alcohol" is to be understood as generic to the class of resins formed from polyvinyl acetate by the successive or combined steps of hydrolysis and condensation with aldehydes or ketones respectively.

In carrying out one embodiment of the process of the invention, a layer on one surface of a sheet of the desired base material may be regenerated to polyvinyl alcohol by means of a suitable hydrolyzing agent. In the case of polyvinyl acetals and similar materials, a suitable hydrolyzing agent is a dilute solution of a mineral acid such, for example, as sulphuric acid or hydrochloric acid. In the case of esters, either a base or an acid hydrolyzing agent may be used. The sheet is then preferably subjected to a treatment which will orient the molecules in said polyvinyl alcohol layer. For example, the sheet may be stretched in one direction to two or more times its original length, or the polyvinyl alcohol layer may be molecularly oriented by treatment thereof with a suitable friction element. In any event, the preferred form of the product at this stage of this embodiment of the invention may be described as comprising a sheet formed predominantly of a transparent polyvinyl alcohol derivative but having an integrally formed surface layer thereon comprising molecularly oriented polyvinyl alcohol.

An illustrative example of a product embodying this form of the invention is shown diagrammatically in Fig. 1, wherein sheet 10 represents a sheet or film composed predominantly of a derivative of polyvinyl alcohol, such for example as polyvinyl acetal, but one surface of which has an integral layer 12 thereon which has been regenerated or converted to polyvinyl alcohol, as indicated by the stippling. Sheet 10 is also represented as having been stretched or otherwise treated to orient the molecules in surface 12, as for example in the direction indicated by arrow 15.

In accordance with one embodiment of the invention, sheet 10 may now be converted to a light polarizer by incorporating a suitable dichroic dye or stain with molecularly oriented polyvinyl alcohol layer 12, for example in the manner set forth in U. S. Patent No. 2,237,567. Such a polarizer will have numerous useful features. Polyvinyl acetal and the similar derivatives of polyvinyl alcohol used in the practice of the invention are in general substantially less hydrophilic than polyvinyl alcohol, and since layer 12 will preferably be relatively thin in comparison with the thickness of sheet 10 as a whole, the resulting polarizer made by dyeing layer 12 will be found less subject to deterioration by moisture or other forces by which it might otherwise be harmed. Furthermore, such a polarizer will be relatively resistant to curling, a disadvantageous feature of other polarizers made from stretched and dyed polyvinyl alcohol.

Figure 2:
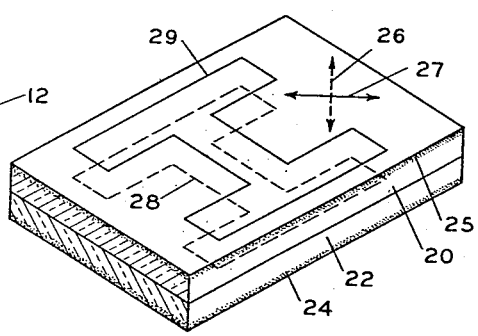
Fig. 2 is a view similar to Fig. 1 showing a composite sheet constituting another embodiment of the invention and having dichroic stereoscopic images reproduced thereon.

Sheet 10 may also be used in the production of dichroic light-polarizing images, preferably in the manner indicated in Fig. 2. Sheets 20 and 22 represent sheets similar to sheet 10 in Fig. 1, and each having a surface layer thereon converted to polyvinyl alcohol, as indicated by stippling at 24 and 25. The direction of molecular orientation in layer 24 is represented by arrow 26 and in layer 25 by arrow 27, and it will be noted that sheets 20 and 22 are shown as bonded together back to back with the directions of molecular orientation in their respective surface layers substantially at right angles to each other.

In Fig. 2, layer 24 is represented as having formed therein an image 28 constituting one image, for example the right-eye image, of a stereoscopic pair. Similarly layer 25 has formed thereon an image 29 constituting the left-eye image of a stereoscopic pair. Images 28 and 29 may be formed in said layers by means of any suitable dichroic dye or stain, such for example as a polyiodide stain or a suitable dichroic direct cotton dye or dyes. When, therefore, the device shown in Fig. 2 is viewed through suitable analyzers, the right eye of the observer will see only image 28 in layer 24, and his left eye will see only image 29 in layer 25, thus producing a three-dimensional effect. It should be understood that said images may be formed in layers 24 and 25 at any desired time during assembly of the device, that is to say, the images may be formed separately before sheets 20 and 22 are bonded together. However, according to the preferred practice, the composite sheet will first be assembled and the images then formed thereon, preferably simultaneously, by applying to each surface thereof a colloid relief which has been imbibed in the desired dichroic dye and which bears thereon one of the desired images. It is to be understood, however, that the invention is not limited to the use of the products thereof in connection with dichroic images, nor to any particular way of forming said images thereon.

Figure 3:
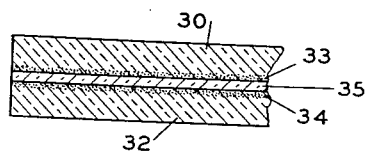
Fig. 3 is a cross-section showing a composite sheet constituting still another embodiment of the invention.

Fig. 3 shows another embodiment of the invention which may be constructed by means of two sheets of the type shown in Fig. 1. Sheets 30 and 32 in Fig. 3 represent two sheets of the type shown in Fig. 1, each having a surface thereof regenerated to polyvinyl alcohol, as indicated by the stippling at 33 and 34 respectively. Layer 35 represents an adhesive bonding together the converted surfaces of sheets 30 and 32, and may comprise, for example, an additional layer of polyvinyl alcohol or other suitable adhesive material.

A composite sheet of the type shown in Fig. 3 may be utilized in a variety of ways. For example, layers 33 and 34 may be converted to light polarizers as explained above in connection with Fig. 1, and the sheets then laminated together by means of layer 35 in order to protect the polarizing surfaces. If sheets 30 and 32 are superimposed with the directions of molecular orientation of layers 33 and 34 parallel, the composite sheet will serve as a light polarizer. If on the other hand the two sheets are put together with said directions of molecular orientation at right angles to each other, substantially no visible light will be transmitted by the combination, and it may be used as a filter for use with infra red rays. By varying the angular relation between the directions of molecular orientation in layers 33 and 34, a filter of any desired density may be obtained. Alternatively, only one of layers 33 and 34 may be rendered light polarizing and the other sheet superimposed thereon as a protection therefor. In still another embodiment, each of layers 33 and 34 may have formed thereon one of the images of a stereoscopic pair as explained above in connection with Fig. 2, and the two sheets may then be superimposed and bonded together with the directions of molecular orientation in layers 33 and 34 at right angles. The operation of this embodiment would be substantially the same as that of the embodiment described in connection with Fig. 2, and would have the additional advantage that layers 30 and 32 would serve to protect the images on layers 33 and 34. Other modifications of this embodiment of the invention will doubtless be apparent to those skilled in the art, and are to be construed as coming within the scope of the invention.

Figure 4:
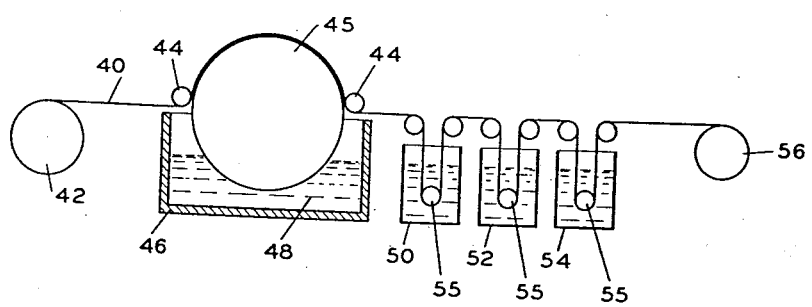
Fig. 4 shows diagrammatically apparatus suitable for use in carrying out some steps of the process of the invention.

Suitable apparatus for use in carrying out the surface regeneration step of the process of the invention is shown diagrammatically in Fig. 4. Plastic sheet or film 40 is passed from supply roll 42 and guided by means of rollers 44 over drum 45 which dips into tank 46 containing hydrolyzing solution 48. Drum 45 is preferably provided with a surface coating of porous material which is adapted to take up solution 48 but will not be affected thereby, and the size and speed of rotation of said drum may be determined and controlled by the time necessary to regenerate a layer of sufficient thickness upon sheet 40. This time is in turn dependent on the temperature and concentration of hydrogen ions in solution 48.

The extent to which the surface of the sheet is converted will preferably be controlled rather carefully. It appears also that for preferred results the surface should be only partially regenerated, that is to say, some of the surface molecules should be retained in their original condition, and if this condition is brought about the result will be to insure a more completely integral structure. In other words, in the preferred product of this process of the invention, the treated layer may be considered as comprising a mosaic or mixture of polyvinyl alcohol and the original material of the sheet. As an illustrative example for bringing about the preferred results, it may be assumed that sheet 40 comprises polyvinyl butyral of the type sold under the trade name "Vinylite X." In this case a suitable hydrolyzing agent is a solution of equal parts of concentrated sulphuric acid and water, and with such a solution a sufficient time of treatment is approximately ten minutes at room temperature. It should be pointed out that in carrying out this embodiment of the process of the invention, it is preferred that only one surface of the sheet come in contact with the hydrolyzing solution, and apparatus of the type shown in Fig. 2 is accordingly advantageous for the reason that it permits unilateral regeneration or conversion of the sheet without further precautions. It is to be understood, however, that the invention is not limited to apparatus of this type nor to this method of treating only one surface of the sheet.

When regeneration of a sufficient layer on sheet 40 is completed, the sheet should be washed, and convenient apparatus for this purpose is indicated diagrammatically in Fig. 4 as comprising tanks 50, 52 and 54, through which sheet 40 may be guided as by means of idler rolls 55. Tank 50 represents a tank of water. Tank 52 is represented as containing a solution capable of neutralizing any of the hydrolyzing solution remaining on the sheet. For example, if solution 48 comprises the sulphuric acid solution mentioned above, tank 52 may contain a 5% solution of sodium bicarbonate. Tank 54 represents a second tank of water through which the sheet may be passed before reaching take-up roll 56. It will be apparent that if desired there may also be provided suitable drying means such as an oven or fan between tank 54 and roll 56.

When the foregoing steps are completed, sheet 40 will have approximately the characteristics described above in connection with Fig. 1, except that the polyvinyl alcohol layer thereon will not be molecularly oriented. The next step in this embodiment of the process of the invention is preferably to bring about the desired molecular orientation of the polyvinyl alcohol layer just formed, and this may be carried out conveniently by stretching the sheet at a temperature sufficient to soften it somewhat, for example 120° C., to two or more times its original length. The direction of stretch may be parallel or perpendicular to the edges of the sheet, as indicated by arrow 15 in Fig. 1, but if the sheet is to be used in the production of light-polarizing stereoscopic images, it is preferred that the direction of molecular orientation, and hence of stretching, be at an angle of substantially 45° to the edge of the sheet, as indicated by arrows 26 and 27 in Fig. 2.

Figure 5:
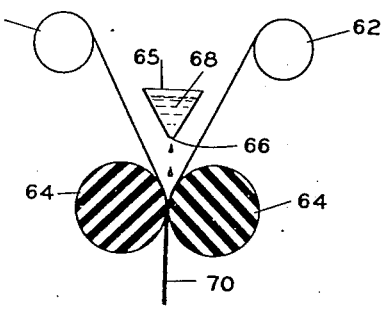
Fig. 5 shows diagrammatically apparatus suitable for carrying out another step of the process of the invention.

Fig. 5 shows diagrammatically convenient apparatus for laminating two sheets such as that shown in Fig. 1 to produce composite sheets such as those shown in Figs. 2 and 3. In Fig. 5, elements 60 and 62 represent rolls of films or a suitable polyvinyl alcohol derivative which has been treated as for example in the manner described in connection with Fig. 4. The sheets from rolls 60 and 62 may be passed between a pair of pressure rolls 64 of rubber or other suitable material, and there may be provided suitable means for applying a laminating solution to the adjacent surfaces of the two sheets just before they pass between rolls 64. As shown in Fig. 5, this may comprise a trough 65 provided with a suitable aperture 66 along its bottom edge and filled with a suitable laminating solution 68. As explained above in connection with Fig. 3, solution 68 may comprise a solution of polyvinyl alcohol, or in making a composite sheet of the type shown in Fig. 2 with sheets 20 and 22 of polyvinyl acetal, solution 68 may comprise acetone or a like solvent. Laminated sheet 70 emerging from between rollers 64 may be considered as corresponding to the sheets shown and described above in connection with Figs. 2 and 3.

It is to be understood that it is possible to make many other modifications of the invention besides those above described without departing from within the scope thereof. It is also to be understood that the specific examples are given by way of illustration only, and that the invention is in no way to be construed as limited thereto. It should be particularly noted that any material may be used for the purposes of the present invention whose characteristics are such that the above described process may be carried out thereon to produce products having the above described properties, and all such materials are to be construed as coming within the scope of the invention.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The process comprising treating a surface of a sheet of polyvinyl alcohol derivative transformable by hydrolysis to polyvinyl alcohol with a hydrolyzing agent, to convert to polyvinyl alcohol a layer on said surface without alteration of the central portion of said sheet, predeterminedly orienting the molecules in said layer, and treating said layer with dichroic material adapted to render the same light-polarizing.

2. The process comprising regenerating to polyvinyl alcohol a layer on a surface of each of a pair of sheets of a polyvinyl alcohol derivative transformable by hydrolysis to polyvinyl alcohol without alteration of the central portion of said sheets by treating each of said surfaces with a hydrolyzing agent, stretching said sheets to orient the molecules in said layers, incorporating dichroic material in at least one of said layers to render it light-polarizing, and bonding said sheets together with the directions of molecular orientation in said layers substantially at right angles to each other and with said oriented layers in juxtaposed relation.

3. An article of manufacture comprising a unitary plastic sheet, a surface portion of said sheet comprising molecularly oriented polyvinyl alcohol and a body portion of said sheet intermediate the surfaces thereof comprising a transparent polyvinyl alcohol derivative chemically transformable to polyvinyl alcohol, said portions being interconnected by a portion comprising copolymer molecules of said derivative and vinyl alcohol, said molecules increasing in vinyl alcohol content in the direction of said oriented surface, said oriented polyvinyl alcohol surface having dichroic material incorporated therein.

4. An article of manufacture comprising a unitary plastic sheet, a surface portion of said sheet comprising molecularly oriented polyvinyl alcohol and a body portion of said sheet intermediate the surfaces thereof comprising a transparent polyvinyl alcohol derivative chemically transformable to polyvinyl alcohol, said portions being interconnected by a portion comprising copolymer molecules of said derivative and vinyl alcohol, said molecules increasing in vinyl alcohol content in the direction of said oriented surface, predetermined areas of said oriented polyvinyl alcohol surface having dichroic material incorporated therein, said areas forming, in combination, a predetermined design.

5. A composite plastic sheet comprising a pair of unitary plastic sheets, a surface portion of each of said unitary sheets comprising molecularly oriented polyvinyl alcohol and a body portion of each of said unitary sheets intermediate the surfaces thereof comprising a transparent polyvinyl alcohol derivative chemically transformable to polyvinyl alcohol, said portions of each said unitary sheet being interconnected by a portion comprising copolymer molecules of said derivative and vinyl alcohol, said molecules increasing in vinyl alcohol content in the direction of the molecularly oriented surface, the directions of molecular orientation of said surface portions being substantially at right angles to each other, predetermined areas of each of said oriented polyvinyl alcohol surfaces having dichroic material incorporated therein, the dichroic areas in each of said sheets forming, in combination, a predetermined image, said images being respectively left-eye and right-eye images of a predetermined stereoscopic pair.

6. A composite plastic sheet comprising a pair of unitary plastic sheets, a surface portion of each of said unitary sheets comprising polyvinyl alcohol and a body portion of each of said unitary sheets intermediate the surfaces thereof comprising a transparent polyvinyl alcohol derivative chemically transformable to polyvinyl alcohol, said portions of each said unitary sheet being interconnected by a portion comprising co-polymer molecules of said derivative and vinyl alcohol, said molecules increasing in vinyl alcohol content in the direction of the polyvinyl alcohol surface, at least one of said polyvinyl alcohol surfaces being molecularly oriented, said molecularly oriented polyvinyl alcohol surface having dichroic material incorporated therein, said sheets being bonded together with polyvinyl alcohol surfaces in face-to-face relation.

7. A composite plastic sheet comprising a pair of unitary plastic sheets, a surface portion of each of said unitary sheets comprising molecularly oriented polyvinyl alcohol and a body portion of each of said unitary sheets intermediate the surfaces thereof comprising a transparent polyvinyl alcohol derivative chemically transformable to polyvinyl alcohol, said portions of each said unitary sheet being interconnected by a portion comprising copolymer molecules of said derivatives and vinyl alcohol, said molecules increasing in vinyl alcohol content in the direction of the molecularly oriented surface, the molecularly oriented polyvinyl alcohol surface of each of said unitary sheets having dichroic material incorporated therein, said sheets being bonded together with the polyvinyl alcohol surfaces in face-to-face relation.

8. An article of manufacture comprising a unitary plastic sheet, a surface portion of said sheet comprising molecularly oriented polyvinyl alcohol and a body portion of said sheet intermediate the surfaces thereof comprising a transparent cyclic ether of polyvinyl alcohol, said portions being interconnected by a portion comprising copolymer molecules of said ether and vinyl alcohol, said molecules increasing in vinyl alcohol content in the direction of said oriented surface, said oriented polyvinyl alcohol surface having dichroic material incorporated therein.

9. An article of manufacture comprising a unitary plastic sheet, a surface portion of said sheet comprising molecularly oriented polyvinyl alcohol and a body portion of said sheet intermediate the surfaces thereof comprising a transparent polyvinyl acetal, said portions being interconnected by a portion comprising copolymer molecules of said acetal and vinyl alcohol, said molecules increasing in vinyl alcohol content in the direction of said oriented surface, said oriented polyvinyl alcohol surface having dichroic material incorporated therein.

10. An article of manufacture comprising a unitary plastic sheet, a surface portion of said sheet comprising molecularly oriented polyvinyl alcohol and a body portion of said sheet intermediate the surfaces thereof comprising a transparent plastic material formed of an organic acid ester of polyvinyl alcohol, said portions being interconnected by a portion comprising copolymer molecules of said ester and vinyl alcohol, said molecules increasing in vinyl alcohol content in the direction of said oriented surface, said oriented polyvinyl alcohol surface having dichroic material incorporated therein.

11. An article of manufacture comprising a unitary plastic sheet, a surface portion of said sheet comprising molecularly oriented polyvinyl alcohol and a body portion of said sheet intermediate the surfaces thereof comprising polyvinyl acetate, said portions being interconnected by a portion comprising copolymer molecules of said polyvinyl acetate and vinyl alcohol, said molecules increasing in vinyl alcohol content in the direction of said oriented surface, said oriented polyvinyl alcohol surface having dichroic material incorporated therein.

12. An article of manufacture comprising a unitary plastic sheet, a surface portion of said sheet comprising molecularly oriented polyvinyl alcohol and a body portion of said sheet intermediate the surfaces thereof comprising a transparent cyclic ether of polyvinyl alcohol, said portions being interconnected by a portion comprising copolymer molecules of said ether and vinyl alcohol, said molecules increasing in vinyl alcohol content in the direction of said oriented surface, predetermined areas of said oriented polyvinyl alcohol surface having dichroic material incorporated therein, said areas forming, in combination, a predetermined design.

13. An article of manufacture comprising a unitary plastic sheet, a surface portion of said sheet comprising molecularly oriented polyvinyl alcohol and a body portion of said sheet intermediate the surfaces thereof comprising a transparent polyvinyl acetal, said portions being interconnected by a portion comprising copolymer molecules of said acetal and vinyl alcohol, said molecules increasing in vinyl alcohol content in the direction of said oriented surface, predetermined areas of said oriented polyvinyl alcohol surface having dichroic material incorporated therein, said areas forming, in combination, a predetermined design.

14. An article of manufacture comprising a unitary plastic sheet, a surface portion of said sheet comprising molecularly oriented polyvinyl alcohol and a body portion of said sheet intermediate the surfaces thereof comprising a transparent plastic material formed of an organic acid ester of polyvinyl alcohol, said portions being interconnected by a portion comprising copolymer molecules of said ester and vinyl alcohol, said molecules increasing in vinyl alcohol content in the direction of said oriented surface, predetermined areas of said oriented polyvinyl alcohol surface having dichroic material incorporated therein, said areas forming, in combination, a predetermined design.

15. An article of manufacture comprising a unitary plastic sheet, a surface portion of said sheet comprising molecularly oriented polyvinyl alcohol and a body portion of said sheet intermediate the surfaces thereof comprising polyvinyl acetate, said portions being interconnected by a portion comprising copolymer molecules of said polyvinyl acetate and vinyl alcohol, said molecules increasing in vinyl alcohol content in the direction of said oriented surface, predetermined areas of said oriented polyvinyl alcohol surface having dichroic material incorporated therein, said areas forming, in combination, a predetermined design.

EDWIN H. LAND.